3,181,657
BRAKE SHOE
Eduard Pelich, Prague, and Oldrich Vana, Jablonec, nad Nisou, Czechoslovakia, assignors to Vyzkumny ustav prislusenstvi motorovych vozidel, Prague, Czechoslovakia
Filed Nov. 15, 1962, Ser. No. 237,923
1 Claim. (Cl. 188—242)

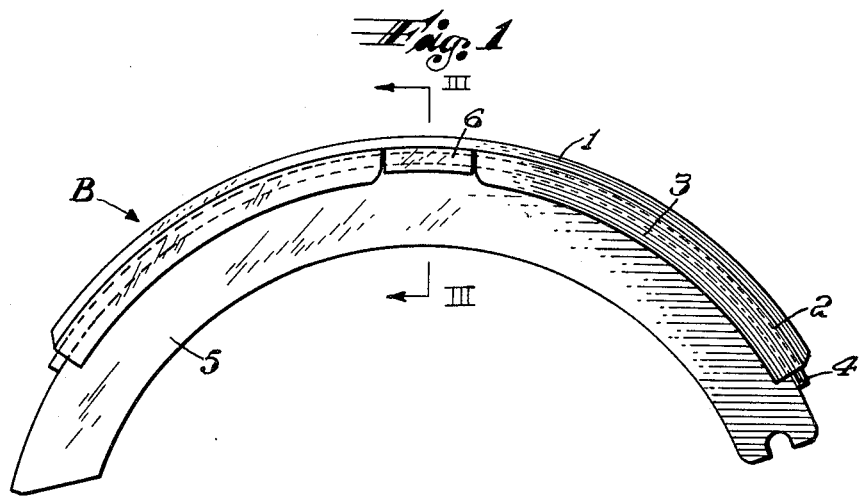
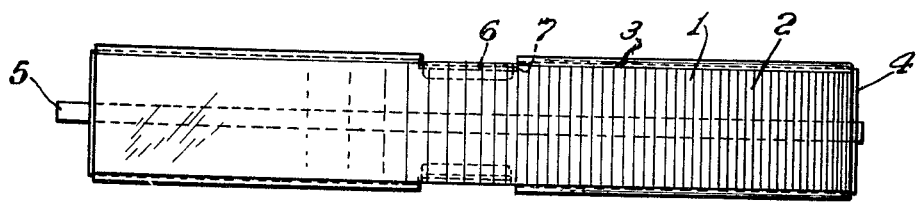
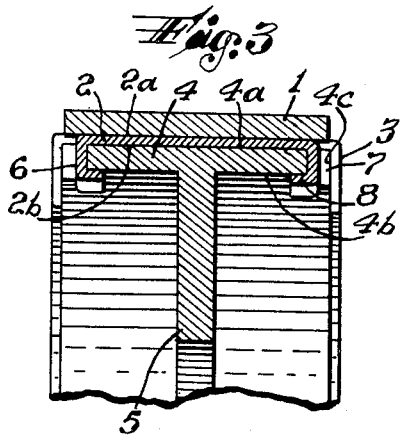
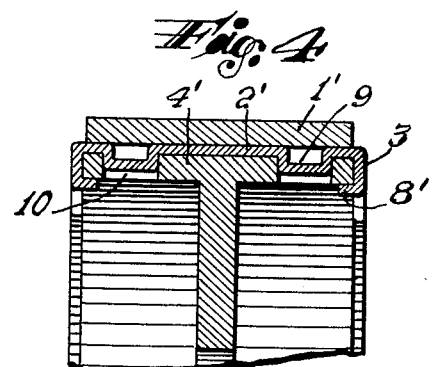

This invention relates to a brake shoe, and more particularly to a brake shoe with a bonded friction lining.

A brake shoe, as ordinarily used for motor vehicles, is provided with a lining made of a material of suitable frictional properties. Up to now the lining has been fixed to a support flange of the shoe by copper or aluminum rivets. It will readily be appreciated that the lining, due to such riveting, can only be used through a part of its thickness since it must be changed when its wear reaches the rivet heads. The necessity for changing linings before they are fully used up involves waste of materials and lack of economy. The present invention aims at a brake shoe which permits linings to be used to the full extent of their frictional action.

It has already been proposed ot bond a lining to a brake shoe by means of an adhesive and to make thus almost complete utilization of the whole thickness of the lining possible, but this proposal suffers from the drawback that removal of remains of an old lining to make room for a new lining is difficult. The last remains of an old lining when it is desired to fit a new lining can only be removed by grinding, which requires, apart from the time involved, mechanical equipment that is not always available. Alternatively, if such grinding operation is not desired or cannot be carried out, it is the whole shoe that has to be changed if the lining is to be changed. Therefore, it is another object of the present invention to provide a brake shoe which need not be changed when the lining is changed, and makes easy and full removal of the remains of an old lining possible.

With the above indicated objects and such other objects as will become apparent from the following description in view, our invention resides in a novel construction, combination and arrangement of parts as set forth hereinafter and sought to be defined in the appended claims.

The objects of the invention, according to one aspect, are achieved by providing a brake shoe which comprises support means having an upper face and side faces, backing means having an upper side, an underside, and lateral sides, a lining bonded to the upper side of the backing means, and fastening means releasably securing the backing means to the support means. The underside of the backing means and the upper face of the support means contact each other. The fastening means are provided on the side faces of the support means and on the lateral sides of the backing means and never interfere with the braking action of the lining. The lining may unobstructedly be used to the very end of its frictional capability.

In accordance with another aspect of the invention, the brake shoe again comprises support means, backing means, a lining, and fastening means. However, in constructions of this type, the fastening means are provided on the upper face of the support means and on the underside of the backing means without entering the body of the lining carried by the backing means. Exactly as in constructions of the first referred to type, there is no interference with the braking action of the lining on the part of the fastening means. Again, the lining may be used as long as it has frictional, that is, braking, power.

The specification is accompanied by a drawing in which:

FIG. 1 is an elevation of a brake shoe of the invention for a wheel of a vehicle;

FIG. 2 is a plan view of the brake shoe;

FIG. 3 is a section taken in the plane of the line III—III of FIG. 1; and

FIG. 4 is a sectioned elevation similar to that of FIG. 3, but showing a modified brake shoe.

Referring to the drawing in greater detail now, and initially to FIGS. 1 to 3, in a brake shoe assembly generally designated B, a backing 2 is shown to have the same curvature as a support or support flange 4, and to be a channel bar which, when viewed in cross section, has the shape of an inverted U. The web of the backing has an upper side 2a and an underside 2b, and carries two flanges 3 and two other flanges or locking portions 6. A brake lining 1 is bonded to the upper side 2a of the web. The backing is made of mild steel sheet but may be made of other metals and of alloys of good thermal conductivity as well, for instance, copper, aluminum. The surfaces 2a and 2b are preferably sanded to help the lining 1 adhere well to the backing, and to enhance friction between the backing 2 and the support flange 4. Any suitable material may be used for the lining 1, such as materials on the basis of asbestos, sintered metals. As bonding material, heat-setting resins are used.

The support flange 4 is of platelike shape and has an upper or top face 4a, a lower or bottom face 4b, and side faces 4c, with a central rib 5 perpendicularly rectangularly projecting from said lower face 4b, the support 4 and the rib 5 constituting the brake shoe proper. The side faces 4c are provided with cut-outs 7. The flanges 3 of the backing 2 extend, as can best be seen in FIG. 2, in a contiguous relation with respect to the side faces 4c of the support flange 4, while each of the two backwardly or inwardly set locking portions 6 abuts against a bottom of one of the cutouts 7. The distance between two opposing portions 6 is smaller than that between the flanges 3. The locking portions 6 and cutouts 7 are matingly formed so that the former fit into the latter.

The traveling direction of a vehicle for one of whose wheels the brake shoe of FIGS. 1 to 3 is intended is perpendicular to the plane upon which the section of FIG. 3 is taken. The interengagement of the portions 6 and cutouts 7 prevents the backing 2 and the lining 1 from moving in relation to the support flange 4 in the traveling direction of the vehicle or in the reverse direction. Also, the portions 6 and the cutouts 7 ensure by their mutual engagement proper circumferential positioning of the backing 2 with respect to the support flange 4. During braking, the friction produced between the backing 2 and the support flange 4 by applying the brake shoe against a brake drum suffices to transmit peripheral forces onto the lining 1.

From FIG. 3, it can also be seen that the locking portions 6 have inwardly directed edge portions 8. The support flange 4 thus is encompassed by means which prevent the backing 2 with its lining 1 from undesired movements in all directions perpendicular to the traveling direction of a vehicle.

The portions 6 and cutouts 7 which engage each other, as well as the edge portions 8, constitute means to releasably fasten the backing 2 which carries the brake lining 1 to the flange support 4, whereby the laterally provided fastening means do not interfere with the utilization of the lining down to the thinnest still useful section.

In the modified brake shoe shown in FIG. 4, a backing 2' is provided with projections or bosses 9 which when the backing that carries the lining 1' is placed on a support flange 4' engages matingly arranged and shaped recesses 10 in the support flange. The projections 9 and recesses 10 form fastening means which are provided on the upper face of the support flange and on the underside of the backing and do not penetrate into the body of the lining as rivets do which have been used so far and are referred to hereinbefore. There are also inwardly directed edge portions 8' on the lateral flanges 3 of the backing 2', which serve the same purpose as the edge portions 8 of FIGS. 1 to 3. The fastening means of FIG. 4 allow the lining 1' to be utilized to the utmost just as the fastening means of FIGS. 1 to 3 do.

It will be appreciated that fastening means other than those shown and described may be used according to the present invention to achieve correct positioning, and to prevent shifting, of the lining. For instance, backing means may be provided with welded-on projections, and support means with corresponding depressions, so that the projections are received in the depressions.

In conformity with our invention, a backing member, once the brake lining on such member is completely worn, is taken off its support, and a backing member having a new brake lining applied thereto is exchanged for the old backing member. According to the invention, a brake lining is bonded to a backing member with the aid of thermosetting resins under known conditions of increased heat and pressure. Such bonding is done in adequately equipped manufacturing places to ensure the formation of a strong and safe bond between the materials involved. Backing members are delivered to automobile manufacturers and repair shops with the respective lining applied thereto, ready to be used and fitted in place.

It is believed that the forms for practicing this invention, as described and shown, their construction and advantages, will be fully understood from the foregoing detailed description. In briefly reviewing the nature of the invention, it is repeated that our brake shoe makes it possible for the frictional material to be completely consumed, which is a great advantage. The invention provides the use of backing means for the brake lining, and of fastening means which secure the backing means to support means and avoid the body of the brake lining. The fastening means fixing backing means and support means to each other may be provided, for instance, on the peripheries of the backing and support means, or on the support means and on that side of the backing means, which is opposite to the side that bears the lining.

It will be apparent that, while we have shown and described our invention in a few forms only, many changes and modifications may be made without departing from the spirit of the invention defined in the following claim.

We claim:
A brake shoe assembly comprising

(a) a striplike support of arcuate shape, having a convex top face, a concave bottom face, and two spaced substantially lengthwise extending margins, and being provided at least at a single point of each of said margins with a radially open cutout, each of said margins consisting of at least two main portions and at least a single offset portion, said offset portion being intermediate of said two main portions, and forming a bottom of the respective cutout, (b) a backing member including
(1) a web portion having an upper side and underside and two spaced substantially lengthwise extending edges, being of the same width as said support, and being shaped to have said underside conformingly engage said top face, each of said edges having at least two first parts extending substantially coextensively with the respective main margin portions, and at least a single second part extending substantially coextensively with the respective offset margin portion,
(2) two flanges extending along said two first parts of each of said web portion edges, and being directed toward said bottom face to abut against the respective two main margin portions,
(3) a flange set inwardly of the respective two flanges to extend along the respective second part to be directed toward said bottom face, and to abut against the bottom of the respective cutout, and
(4) an edge portion extending from each of the inwardly set flanges toward the other inwardly set flange, and (c) a brake lining on said upper side.

References Cited by the Examiner
UNITED STATES PATENTS

| 1,682,319 | 8/28 | Bluhm | 188—234 |
| 1,857,124 | 5/32 | Brackett | 188—234 |
| 1,875,374 | 9/32 | Gallup | 188—242 |
| 2,128,467 | 8/38 | Merritt | 188—234 |
| 2,631,697 | 3/53 | Bonkowski | 188—234 |
| 2,791,299 | 5/57 | Bonkowski | 188—234 |
| 2,791,300 | 5/57 | Bonkowski | 188—234 |

ARTHUR A. LA POINT, *Primary Examiner.*